Figure 1:
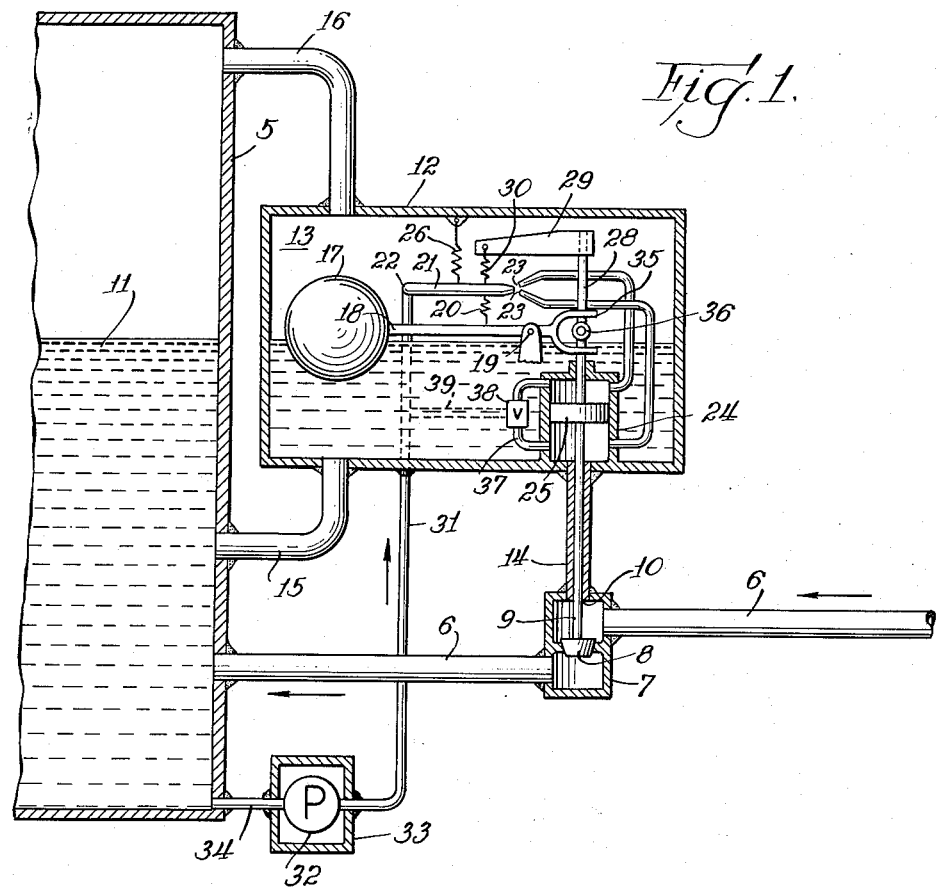

United States Patent Office 3,004,554
Patented Oct. 17, 1961

3,004,554
LEAK-PROOF FLUID SYSTEM REGULATOR
Herbert W. Ziebolz, New York, N.Y., assignor to Gpe Controls, Inc., a corporation of Illinois
Filed Aug. 18, 1958, Ser. No. 755,717
3 Claims. (Cl. 137—415)

The present invention relates to servo motor operated mechanisms that are utilized for moving controlled members disposed inside of sealed systems, necessitating transfer of movements, or forces through walls forming parts of the enclosing structure of such systems. Heretofore common practice in such situations has been to transmit motion or force to the movable member so enclosed by way of a movable element penetrating the system wall through a packed joint, permitting the necessary movement but, as effectively as possible, preventing flow of the media present respectively in the interior and exterior of the system, and, in the case that the transmission element is reciprocal, performing a wiping or scraping function tending to prevent or at least reduce carrying of such media through the seal by the surface of the moving element.

The present invention more specifically is directed to solutions of problems of providing for movement of such a system-enclosed member in a situation that so rigidly requires complete, hermetic sealing as to completely preclude the possibility of employing of transmission elements movably penetrating a wall of the system.

A typical situation wherein the invention is of great utility and one wherein it is disclosed herein, is that of a fluid flow system wherein control or regulation of the volume rate of flow is to be automatically effected in response to variation of magnitude of some condition that exists within the system, and wherein the nature of the process, or of one or the other, or both of the media within and surrounding the system is such as to require hermetic sealing to prevent even minute exit of one or entrance of the other. The invention also relates to the problems of providing powered relay operation for the purposes indicated, within a hermetically sealed system that encloses all moving parts.

A primary object of the invention is to provide a novel type of arrangement, in a sealed system for conduction of flowing fluid, which arrangement permits use of movable transmission elements for actuating movable members within the system and preventing escape of fluid from the system or admittance to the system of a surrounding medium.

Another object is to provide such an arrangement that includes powered, servo mechanism actuating means for driving the movable transmission elements.

Still another object is to provide a novel arrangement of apparatus for accomplishing automatic control of level of liquid in a container forming a portion of a hermetically sealed system, by positioning a flow regulating valve in a flow line also forming a part of the sealed system, including servo mechanism for positioning the valve in response to departures of the level from that required, and so arranged, in accordance with the invention, as to so seal all of the apparatus in the flow line container system as to preclude passage of fluid into or out of the system through a packing associated with the transmission element through which the servo mechanism positions the valve body.

A further object is the provision of such an arrangement having novel provision for automatic emergency rough operation of the valve in the event of failure of the servo mechanism.

In the accompanying drawings:
FIG. 1 is a vertical section through a system for automatically maintaining constant liquid depth in a tank, by regulating delivery of liquid to the tank through the flow line, including an embodiment of the invention.

Figure 2:
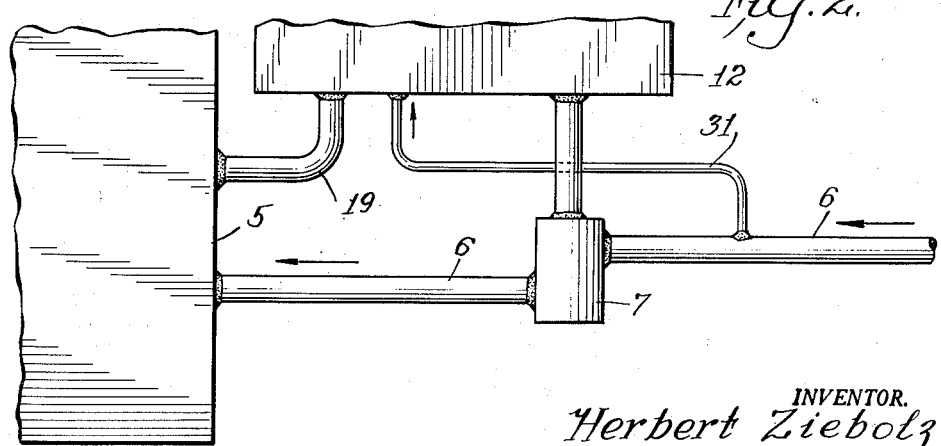

FIG. 2 is an elevation showing a slightly modified arrangement of the system.

Describing the drawings in detail, the fluid-containing system shown in FIG. 1 includes a liquid-containing tank 5, a flow line 6 for delivering liquid to the tank and a valve housing 7 connected between two sections of line 6. A valve body 8 is arranged in housing 7, and, to regulate liquid flow, is positionable by a transmission element, shown as an axially reciprocal rod 9 that is extended through a close-fitting, preferably packed opening at 10 in the valve housing.

It is contemplated that the purpose of the system is such as to make it necessary to absolutely prevent escape of liquid from the system, even to the minute extent resulting from seepage, or from mechanical transport by rod 9 during valve body positioning, permitted by packing glands, stuffing boxes or other seals conventionally used to stop leakage about movable transmission elements that necessarily are employed to permit positioning of system-enclosed movable members. The wall means forming the system elements 5, 6 and 7 are hermetically sealed together, as by welded joints, and the arrangements of the invention, now to be described, are such as absolutely to preclude passage of fluid in either direction through relative motion joints that are necessarily provided for transmitting motion to condition controlling movable members disposed within the system. In its broadest aspect the invention resides in provision of relay mechanism hermetically enclosed in a sealed enclosure, which enclosure is sealed to the wall structure of the fluid-containing system in surrounding relation to a transmission element movably extended through the wall of that system. Further, the invention contemplates arrangement of the relay enclosure so that its interior is maintained, by hermetically sealed connection structure, in communication with the interior of the fluid containing system, so that detector means hermetically enclosed by the combined wall structure of the relay enclosure and fluid containing system proper can be associated with the relay mechanism for automatic positioning of the transmission element and the member that it moves in response to variation in the detected condition.

To these ends, in accordance with the invention, there is provided adjacent line 6 and in the region of valve housing 7 a hermetically sealed wall structure 12 enclosing a chamber 13. Structure 12 includes a portion, here a tubular extension 14 that surrounds transmission element 9 and is sealed, as by welding, to the fluid system containing wall, here valve housing 7, in surrounding relation to opening 10, so that actuating mechanism for element 9 being wholly enclosed in structure 12, passage of fluid is precluded in either direction between the interior of the system and space surrounding the system proper and structure 12.

In the specific liquid level control apparatus shown, chamber 13 is arranged in communication with the interior of tank 5, in such way that liquid level is the same in both, as by pipes 15, 16 respectively below and above limits of liquid level variation. These pipes are hermetically sealed to the walls of tank 5 and structure 12. A liquid level detector is arranged in chamber 13 and comprises a float 17 carried by an arm 18 for swinging about a horizontal axis provided by a pivot connection 19. By a transmission spring 20 movements of arm 18 are transmitted to a jet pipe 21, which, in well known fashion, is pivoted to swing about a horizontal axis at 22, to discharge a jet stream of pressurized fluid toward a pair of receiver ports 23 narrowly spaced vertically in disposition for receiving fluid from pipe 21. Ports 23 connected to opposite ends of a cylinder 24, the arrangement being such that while the jet pipe is in equal registration with ports 23 equal pressures are developed in the cylinder ends and piston 25 is maintained stationary, but pressure unbalance appearing upon displacement of the jet pipe from such equal registration results in movement of piston 25 in a corresponding direction.

The relay regulator arrangement of which jet pipe 21 constitutes the movable control member includes a setting spring 26 for resisting force exerted by transmission spring 20, and setting of which determines the liquid level at which jet pipe 21 occupies its neutral position. Piston 25 has connected to it a rod 28 which carries an arm 29 between which and jet pipe 21 is arranged a transmission spring 30, an arrangement for proportioning piston stroke to degree of jet pipe deflection initiating it, through restoration of the jet pipe to its neutral position. Piston 25 additionally is connected to transmission element 9.

Fluid is delivered to jet pipe 21 for jet discharge by a supply line 31 which extends through the wall of structure 12 and is hermetically sealed to it, as by welding. Depending on the purpose of the fluid containing system, the operating fluid may be supplied to pipe 21 in various ways. Such fluid may be supplied from an external source in a situation wherein the process conducted within the system will tolerate addition of such fluid from such a source. In the event that it will not, fluid within the system itself may be used, alternative arrangements for such purposes being shown in FIGS. 1 and 2. In FIG. 1 operating fluid for the relay is withdrawn from tank 5 and is supplied to conduit 31 under suitable pressure by a submerged pump unit 32. Unit 32 is enclosed in a hermetically sealed casing 33 to which also are welded input line 34 and supply conduit 31, the former also being welded to the wall of tank 5.

In the FIG. 2 arrangement relay supply conduit 31 is connected to flow line 6 at the supply side of valve housing 7. Operation of this arrangement depends on there being dependably sufficient pressure drop across the valve to assure effective relay operation. It also may be noted that, whereas in the FIG. 1 arrangement, relay operating liquid is recirculated from and to tank 5 at constant volume rate, therefore without effect upon the level of liquid in the tank, or upon complete control of rate of fluid delivery by position of valve body 8, in the FIG. 2 arrangement the by-pass afforded around the valve by line 31 and pipe 15 provides continuous delivery of fluid to tank 5 regardless of the setting of valve body 8.

Advantageously the relay mechanism enclosed by structure 12 is arranged to provide for automatic assumption of direct drive of transmission element 9 and valve body 8 in the event of failure of relay power fluid supply. This is simply and effectively provided in the FIG. 1 arrangement by a lost motion connection between float lever 18 and piston rod 28, a fork 35 on arm 18 embracing a pin 36 on rod 28. Sufficient lost motion is provided by spacing of the arms of fork 35 to avoid piston movement of float 17 and arm 18, but upon material departure of the liquid level from that required, and in the absence of relay operation, the relatively large displacement of float 17 and arm 18 will take up the lost motion, and further float movement will drive valve body 8. To prevent hydraulic lockup of piston 25 a by-pass 37 may be provided, controlled by a pressure responsive cutoff valve 38 connected to supply line 31 by a branch line 39 and arranged to close the by-pass under influence of pressure in line 31, but to open it upon drop of that pressure.

From the foregoing construction, mode of operation and many advantages of arrangements made in accordance with the invention herein disclosed will be apparent, and it is to be understood that changes, alterations and modifications of the exemplary disclosure herein may be resorted to within the scope of the invention as defined by the appended claims.

I claim:

1. A liquid level control system for controlling the level of fluid supplied through a supply line to a tank, comprising in combination: a valve interposed in said supply line to control flow of fluid through said supply line to said tank; said supply line, tank and valve all being hermetically integral; a float operative to sense the instantaneous level of said fluid and to apply a first force to position a jet pipe, said jet pipe being pivotally supported to selectively distribute fluid under pressure to a pair of received ports connected to opposite sides of a piston in a cylinder, said piston being mechanically connected to position said valve and to apply a feedback force to position said jet pipe relative to said ports; and a mechanical lost-motion connection between said float and said valve, whereby said float is connected to operate said valve upon extreme changes in said liquid level.

2. A system according to claim 1 which includes a by-pass connection between opposite ends of said cylinder on opposite sides of said piston.

3. A system according to claim 2 including a pressure-controlled valve in said by-pass connection adapted to close and block said by-pass connection if pressure in said supply line exceeds a predetermined value.

References Cited in the file of this patent

UNITED STATES PATENTS

| 987,048 | Connet | Mar. 14, 1911 |
| 2,339,469 | Emanuel | Jan. 18, 1944 |
| 2,341,644 | Moller | Feb. 15, 1944 |
| 2,827,020 | Cook | Mar. 18, 1958 |
| 2,855,860 | Crump | Oct. 14, 1958 |

FOREIGN PATENTS

| 708,694 | France | May 4, 1931 |

OTHER REFERENCES

Askania Bulletin 303; Stability in Automatic Controls; part II Askania Control System; page 5, Fig. 12; January 1956. (Copy in Div. 28, 137–83.)